United States Patent
Adra et al.

(10) Patent No.: US 7,202,625 B2
(45) Date of Patent: Apr. 10, 2007

(54) MULTI-MOTOR SWITCHED RELUCTANCE TRACTION SYSTEM

(75) Inventors: Rodwan T. Adra, Peoria, IL (US); Michael A. Caruthers, Washington, IL (US)

(73) Assignee: Caterpillar Inc, Peoria, IL (US)

( * ) Notice: Subject to any disclaimer, the term of this patent is extended or adjusted under 35 U.S.C. 154(b) by 64 days.

(21) Appl. No.: 11/066,248

(22) Filed: Feb. 25, 2005

(65) Prior Publication Data
US 2006/0192518 A1 Aug. 31, 2006

(51) Int. Cl.
H02P 9/14 (2006.01)
H02P 7/06 (2006.01)
B06K 6/04 (2006.01)

(52) U.S. Cl. .............. 318/701; 318/139; 180/65.2; 180/65.4

(58) Field of Classification Search ............ 318/245, 318/254, 139, 439, 701; 310/49 R, 114; 180/65.2, 65.4, 243
See application file for complete search history.

(56) References Cited

U.S. PATENT DOCUMENTS

| | | | | |
|---|---|---|---|---|
| 3,483,410 A | * | 12/1969 | Lencioni, Jr. et al. | 310/114 |
| 4,670,696 A | | 6/1987 | Byrne et al. | |
| 4,698,537 A | | 10/1987 | Byrne et al. | |
| 4,845,417 A | * | 7/1989 | Ohkubo et al. | 318/696 |
| 4,943,760 A | | 7/1990 | Byrne et al. | |
| 5,008,572 A | * | 4/1991 | Marshall et al. | 310/45 |
| 5,084,662 A | * | 1/1992 | Palaniappan et al. | 318/701 |
| 5,410,200 A | * | 4/1995 | Sakamoto et al. | 310/49 R |
| 5,489,001 A | * | 2/1996 | Yang | 180/65.2 |
| 5,586,613 A | * | 12/1996 | Ehsani | 180/65.2 |
| 5,652,493 A | * | 7/1997 | Hendershot, Jr. | 318/701 |
| 5,760,503 A | * | 6/1998 | Tsuchida et al. | 310/49 R |
| 5,821,710 A | * | 10/1998 | Masuzawa et al. | 318/254 |
| 5,973,431 A | * | 10/1999 | Li et al. | 310/168 |

(Continued)

FOREIGN PATENT DOCUMENTS

EP 0441970 8/1991

(Continued)

OTHER PUBLICATIONS

Miller J. M. et al.: "Starter-alternator for hybrid electric vehicle: comparison of induction and variable reluctance machines and drives" Industry Applications Conference, 1998 IEEE St. Louis, MO, USA Oct. 12-15, 1998. New York, NY, USA, IEEE, US vol. 1, Oct. 12, 1998 pp. 513-523, XP010313139 ISBN: 0-7803-4943-1 p. 517, paragraph G-p. 518; fig. 9.

(Continued)

*Primary Examiner*—Paul Ip
(74) *Attorney, Agent, or Firm*—Finnegan, Henderson, Farabow, Garrett & Dunner (57) ABSTRACT

A switched reluctance traction system is provided for work machines. The switched reluctance traction system may include a plurality of switched reluctance motors. Each switched reluctance motor may include a stator with a plurality of stator poles and a rotor with a plurality of rotor poles. The switched reluctance traction system may also include one or more coupling elements to couple together the plurality of switched reluctance motors such that each of the plurality of motors is capable of driving the switched reluctance traction system independently.

17 Claims, 8 Drawing Sheets

U.S. PATENT DOCUMENTS

| | | | |
|---|---|---|---|
| 6,137,256 A * | 10/2000 | Morris | 318/701 |
| 6,153,953 A * | 11/2000 | Isozaki et al. | 310/49 R |
| 6,259,176 B1 * | 7/2001 | Isozaki et al. | 310/49 R |
| 6,331,365 B1 | 12/2001 | King | |
| 6,359,414 B1 | 3/2002 | Nickel | |
| 6,462,430 B1 * | 10/2002 | Joong et al. | 290/40 C |
| 6,479,959 B2 * | 11/2002 | Choe | 318/439 |
| 6,486,576 B1 * | 11/2002 | Yura et al. | 310/49 R |
| 6,563,246 B1 * | 5/2003 | Kajiura et al. | 310/162 |
| 6,577,022 B2 * | 6/2003 | Joong et al. | 290/40 C |
| 6,616,569 B2 | 9/2003 | Hoang et al. | |
| 6,684,483 B2 | 2/2004 | Rahman et al. | |
| 6,717,381 B2 | 4/2004 | Inagaki et al. | |
| 6,737,822 B2 | 5/2004 | King | |
| 6,833,646 B2 * | 12/2004 | Joong et al. | 310/114 |
| 7,002,274 B2 * | 2/2006 | Kim et al. | 310/114 |
| 7,042,189 B2 * | 5/2006 | Hossain et al. | 318/701 |
| 7,081,725 B2 * | 7/2006 | Seely et al. | 318/139 |
| 2002/0100624 A1 * | 8/2002 | Joong et al. | 180/65.4 |
| 2003/0102674 A1 * | 6/2003 | Joong et al. | 290/40 C |
| 2003/0164655 A1 | 9/2003 | Biais et al. | |
| 2003/0201749 A1 * | 10/2003 | Hossain et al. | 318/701 |
| 2004/0021390 A1 * | 2/2004 | Kim et al. | 310/191 |
| 2004/0200654 A1 * | 10/2004 | Hatsuda et al. | 180/243 |
| 2005/0072608 A1 * | 4/2005 | Johnston et al. | 180/65.2 |
| 2006/0006744 A1 * | 1/2006 | Nashiki | 310/49 R |
| 2006/0038517 A1 * | 2/2006 | MacKay | 318/254 |
| 2006/0097594 A1 * | 5/2006 | Abou-Akar et al. | 310/156.01 |

FOREIGN PATENT DOCUMENTS

| | | |
|---|---|---|
| EP | 0609800 | 8/1994 |
| WO | WO-2004/055958 A1 | 1/2004 |

OTHER PUBLICATIONS

Longya Xu et al.: "Analysis of a novel converter topology for switched reluctance machine drives" Power Electronic Drives and Energy Systems for Industrial Growth, 1998. Proceedings. 1998 International Converence on Perth, Western Australia Dec. 1, 1998, Piscataway, NJ, USA, IEEE, vol. 2, Dec. 1-3, 1998, pp. 640-645, XPO10720597 ISBN: 0-7803-4879-6, p. 641, col. 2 p. 642; fig. 3.

Ahn J-W et al.: "A three-phase switched reluctance motor with two-phase excitation" IEEE Transactions on Industry Applications, IEEE Service Center, Piscataway, NJ, US, vol. 35, No. 5, Sep. 1999. pp. 1067-1075, XP000924258 ISSN: 0093-9994 Paragraph (0001); fig.1.

* cited by examiner

MULTI-MOTOR SWITCHED RELUCTANCE TRACTION SYSTEM

TECHNICAL FIELD

This disclosure relates generally to systems including switched reluctance motors and, more particularly, to traction systems including a plurality of switched reluctance traction motors.

BACKGROUND

Modern work machines or vehicles may be powered by electrical propulsion systems. The electrical propulsion systems often include electric drive traction systems that provide driving force to traction devices of the work machines or vehicles operated on high power density batteries. Recently, electric drive traction systems using switched reluctance traction motors have been developed.

Switched reluctance traction motors may have various motor topologies (e.g., the number of stator poles, the number of coils, and the number of rotor poles, etc.). In certain situations, motor topology of a switched reluctance traction motor may be determined based on the number of phases of conduction when supplying direct current (DC) to the motor. A switched reluctance traction motor may have 2 phases, 3 phases, 4 phases, or even more. Generally, a switched reluctance traction motor may have an independent stator pole set associated with each phase of conduction. For example, a switched reluctance traction motor designed to operate on a 4-phase conduction (a 4-phase switched reluctance traction motor) may have 4 sets of independent stator poles. When the total number of the phases increases, the total number of stator poles may also increase. More power may be drawn by the motor, and the complexity of the motor may also increase.

Some switched reluctance traction motors use 3-phase topology, such as described in U.S. Pat. No. 6,717,381 (the '381 patent) issued to Inagaki et al. on Apr. 6, 2004. The '381 patent describes a control device for a 3-phase switched reluctance traction motor. Three-phase switched reluctance traction motors may offer some advantages because the 3-phase motors may use power converters built on standard electronic components. For example, a common building block for most power converters may be an isolated gate bipolar junction transistor (IGBT). IGBTs designed for 3-phase electric induction type motors are considered as standard components and may be available commercially at a low cost.

Three-phase induction type traction motors, however, may still be more costly and less reliable than switched reluctance traction motors under certain circumstances. Two-phase switched reluctance traction motors may be designed to eliminate certain limitations of 3-phase induction type motors. However, power converter components for conventional 2-phase switched reluctance traction motors are often considered as "non-standard" and may not be readily available. Further, conventional 2-phase switched reluctance traction motors may suffer from high torque ripples and may also have dead bands where stator poles and rotor poles are in a particular position or positions such that the motor cannot be started.

Methods and systems consistent with certain features of the disclosed systems are directed to solving one or more of the problems set forth above.

SUMMARY OF THE INVENTION

One aspect of the present disclosure includes a switched reluctance traction system. The switched reluctance traction system may include a plurality of switched reluctance motors. Each switched reluctance motor may include a stator with a plurality of stator poles and a rotor with a plurality of rotor poles. The switched reluctance traction system may also include one or more coupling elements to couple together the plurality of switched reluctance motors, such that each of the plurality of motors is capable of driving the switched reluctance traction system independently.

Another aspect of the present disclosure includes a method for driving a work machine. The method may include generating electrical power with a power source and supplying a portion of the power to a multi-motor switched reluctance traction system. The method may also include generating a torque with the multi-motor switched reluctance traction system and applying the torque to traction devices of the work machine. The multi-motor switched reluctance traction system may include a plurality of 2-phase switched reluctance motors, each of which may have a stator with a plurality of stator poles and a rotor with a plurality of rotor poles. The multi-motor switched reluctance traction system may also include one or more coupling elements to couple together the plurality of 2-phase switched reluctance motors, such that each of the plurality of motors is capable of driving the switched reluctance traction system independently.

Another aspect of the present disclosure includes a 2-phase switched reluctance motor. The 2-phase switched reluctance motor may include a phase A coil having a positive lead and a negative lead and a phase B coil having a positive lead and a negative lead. The 2-phase switched reluctance motor may also include a power converter to supply power to the phase A coil and the phase B coil. The power converter may include an input line and an output line coupled with a DC power source. The power converter may also include a first isolated gate bipolar junction transistor (IGBT) package coupled between the positive DC power line and positive lead of the phase A coil and a second IGBT package coupled between the positive lead of the phase A coil and the negative DC power line. The power converter may also include a third IGBT package coupled between the positive DC power line and both the negative lead of the phase A coil and the positive lead of the phase B coil, and a fourth IGBT package coupled between both the negative lead of the phase A coil and the positive lead of the phase B coil and the negative DC power line. Further, the power converter may include a fifth IGBT package coupled between the input line and the negative lead of the phase B coil, and a sixth IGBT package coupled between the negative lead of the phase B coil and the negative DC power line.

Another aspect of the present disclosure includes a work machine. The work machine may include a switched reluctance traction system. The switched reluctance motor system may include a plurality of switched reluctance motors. Each switched reluctance motor may include a stator with a plurality of stator poles and a rotor with a plurality of rotor poles. The switched reluctance motor system may also include a coupling device to couple together the plurality of switched reluctance motors such that the stator poles of one motor are aligned with the stator poles of another motor and the rotor poles of one motor are shifted by a predetermined angle relative to the rotor poles of another motor. The work machine may also include a power source configured to provide electrical power to the switched reluctance traction system.

BRIEF DESCRIPTION OF THE DRAWINGS

The accompanying drawings, which are incorporated in and constitute a part of this specification, illustrate several embodiments and together with the description, serve to explain the principles of the disclosed embodiments. In the drawings.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
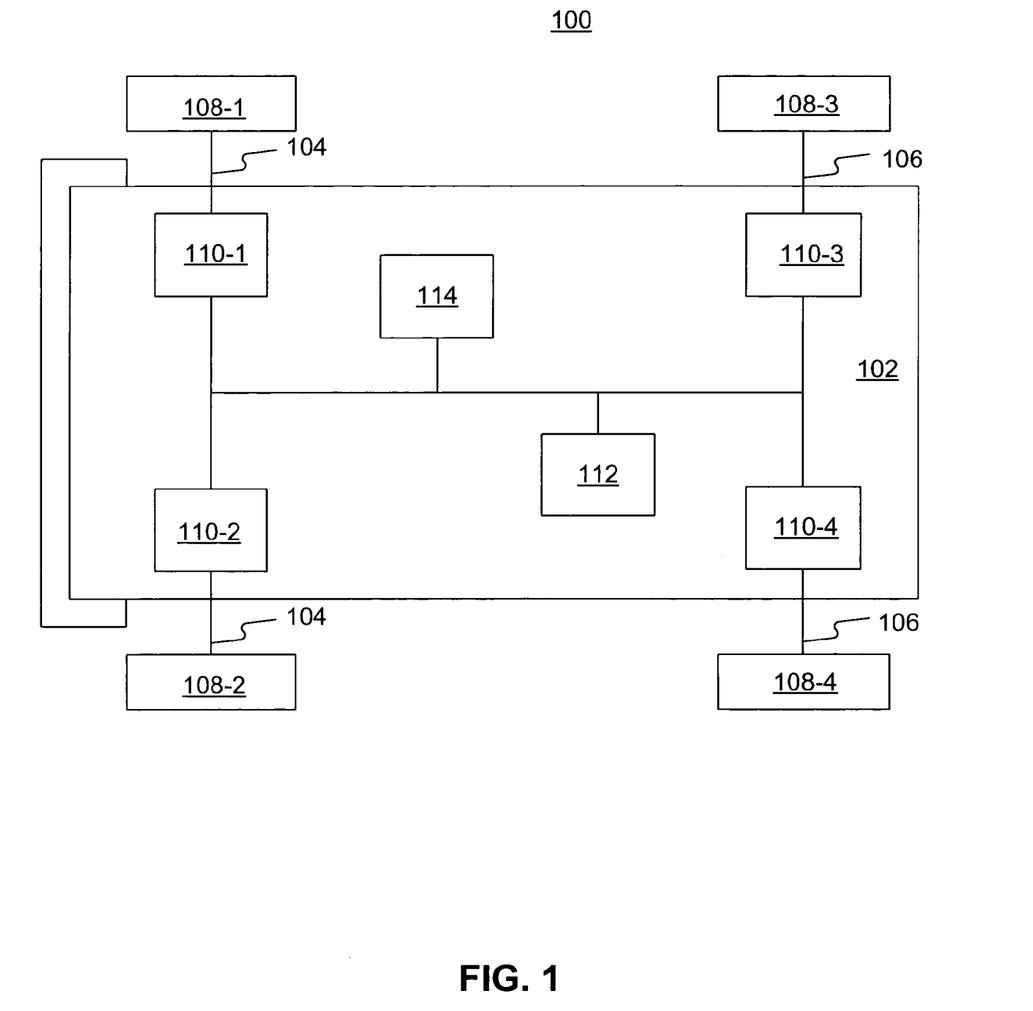
FIG. 1 illustrates a functional block diagram of a work machine incorporating certain disclosed embodiments.

FIG. 1 illustrates an exemplary work machine 100 incorporating the disclosed embodiments. Work machine 100 may refer to any type of mobile machine that performs some type of operation associated with a particular industry, such as mining, construction, farming, transportation, etc. and operates between or within work environments (e.g., construction site, mine site, power plants, on-highway applications, etc.). Work machine 100 may also refer to any type of automobile or commercial vehicle. Non-limiting examples of mobile machines include on-highway vehicles, commercial machines, such as trucks, cranes, earth moving vehicles, mining vehicles, backhoes, material handling equipment, farming equipment, marine vessels, aircraft, and any type of movable machine that operates in a work environment, and/or cars, vans, trucks, and any type of automobile or commercial vehicle.

As shown in FIG. 1, work machine 100 may include a chassis 102, a front axle 104, a rear axle 106, traction devices 108-1 to 108-4 (e.g., wheels, tracks, etc), switched reluctance traction systems 110-1 to 110-4, a power source 112, and a controller 114. Power source 112 may be any type of power source that provides electrical power to switched reluctance traction systems 110-1 to 110-4. Power source 112 may use an internal combustion engine coupled with a generator to supply electrical power to traction systems 110-1 to 110-4. Alternatively, power source 112 may be a fuel cell generator configured to directly supply electrical power to traction systems 110-1 to 110-4. Power source 112 may also include a hybrid system including two or more different types of devices for converting an energy supply to electrical energy or for directly supplying electrical energy.

Figure 2:
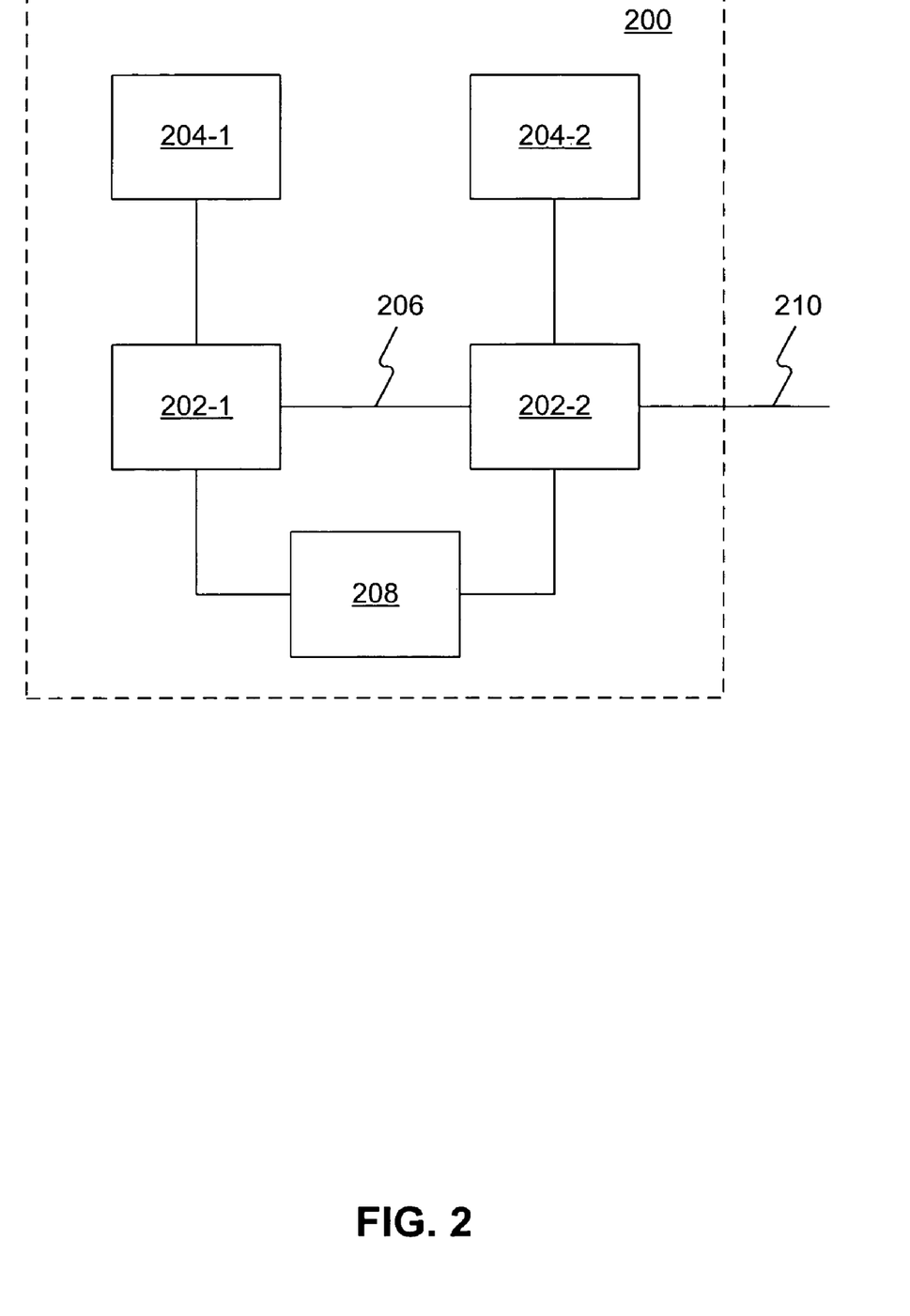
FIG. 2 illustrates a functional block diagram of an exemplary switched reluctance traction system consistent with certain disclosed embodiments.

Switched reluctance traction systems 110-1 to 110-4 may be mounted on chassis 102 to provide driving force to traction devices 108-1 to 108-4, respectively. Alternatively and/or optionally, switched reluctance traction systems 110-1 to 110-4 may be used as a generator under certain operational conditions. Although FIG. 2 shows each switched reluctance traction system associated with one traction device, other configurations may also be used. Any number of switched reluctance traction systems may be used to provide power to traction devices 108-1 to 108-4.

Switched reluctance traction systems 110-1 to 110-4 may be mounted on chassis 102 by any appropriate means. For example, switched reluctance traction systems 110-1 and 110-2 may be mounted back to back in the direction of front axle 104 such that switched reluctance traction systems 110-1 and 110-2 may directly drive traction devices 108-1 and 108-2, respectively. Similarly, switched reluctance traction systems 110-3 and 110-4 may be mounted back to back in the direction of rear axle 106 such that switched reluctance traction systems 110-3 and 110-4 may directly drive traction devices 108-3 and 108-4, respectively. Other types of mounting arrangements, however, may also be used.

Traction devices 108-1 and 108-2 may be supported by front axle 104 and driven by traction system 110-1 and 110-2, respectively. Traction devices 108-3 and 108-4 may be supported by rear axle 106 and driven by traction systems 110-3 and 110-4, respectively. Further, controller 114 may control operations of power source 112 and/or switched reluctance traction system 110-1 to 110-4.

Controller 114 may be any appropriate type of control system used to control switched reluctance traction systems, and/or mobile power plant operations, such as power source 112. Although not shown in FIG. 1, controller 114 may include any appropriate type of sensors, microcontrollers or microprocessors, digital signal processors, memory modules, or other electronic components. Controller 114 may also provide control functionalities to other components (not shown) of work machine 100.

As explained above, switched reluctance traction systems 110-1 to 110-4 may be supplied with electrical power from power source 112 to generate driving torque. FIG. 2 shows a block diagram of an exemplary switched reluctance traction system 200. Switched reluctance traction system 200 may correspond to any of switched reluctance traction systems 110-1 to 110-4.

As shown in FIG. 2, switched reluctance traction system 200 may include two separate switched reluctance motors 202-1 and 202-2, power converters 204-1 and 204-2, a coupling means 206, a controller 208, and a torque outputting means 210. Although FIG. 2 shows two separate switched reluctance motors 202-1 and 202-2, any number of switched reluctance motors may be included, and/or switched reluctance motors 202-1 and 202-2 may be merged into a single switched reluctance motor.

Switched reluctance motors 202-1 and 202-2 may be any appropriate type of switched reluctance motors. In certain embodiments, switched reluctance motors 202-1 and 202-2 may be 8/4 2-phase switched reluctance motors, such as an exemplary switched reluctance motor 300 shown in FIG. 3.

Figure 3:
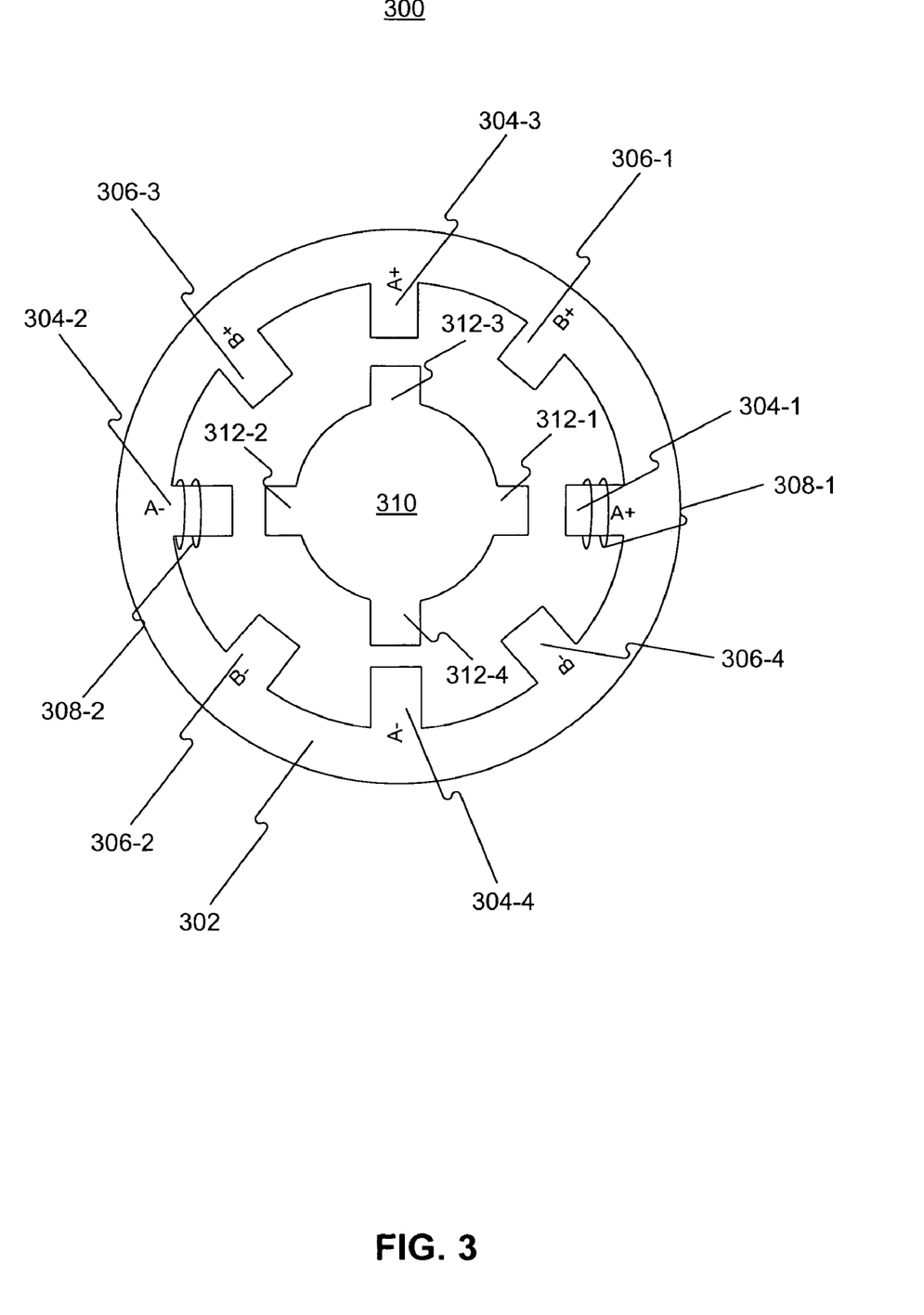
FIG. 3 illustrates an exemplary switched reluctance motor consistent with certain disclosed embodiments.

As illustrated in FIG. 3, an 8/4 2-phase (i.e., eight stator poles, four rotor poles, and 2-phase conduction) switched reluctance traction motor 300 may include a stator 302, a rotor 310, and stator coils (e.g., stator electrical coils 308-1 and 308-2). Stator 302 may include eight salient stator poles configured in groups of stator pole sets. A stator pole set may include two or more stator poles corresponding to the number of phases (e.g., 2) of switched reluctance traction motor 300. The total of eight stator poles may then be grouped into two phase sets such that poles 304-1 to 304-4 may be grouped into one phase set and stator poles 306-1 to 306-4 may be grouped into the other phase set. Each stator pole of stator poles 304-1 to 304-4 and 306-1 to 306-4 may be wound by electrical coils. For example, stator poles 304-1 and 304-2 may be wound by electrical coils 308-1 and 308-2, respectively. Other stator poles may also be wound by electrical coils (not shown).

Rotor 310 may include a plurality of rotor poles. For example, rotor 310 may include a total of four rotor poles 312-1 to 312-4. It is understood that the number of stator poles and rotor poles is exemplary only and not intended to be limiting. Any number of stator poles and rotor poles may be used.

In operation, DC current may be introduced to pass through the electrical coils on stator poles to excite the stator poles. As explained, the number of pole sets may correspond to the number of phases (e.g., phase A and phase B). During phase A conduction, DC current may be used to excite one phase set (e.g., stator poles 304-1 to 304-4); and during phase B conduction, DC current may be used to excite the other phase set (e.g., stator poles 306-1 to 306-4). For example, DC current may be introduced to electrical coils 308-1 and 308-2 during phase A conduction. Associated with electrical coils 308-1 and 308-2, stator poles 304-1 and 304-2 may be excited to generate a magnetic flux. A torque may then be generated by a tendency of rotor 310 to align with excited stator poles 304-1 and 304-2. The direction of the torque generated may be a function of the position of rotor poles 312-1 to 312-4 with respect to the position of stator poles 304-1 and 304-2. The direction of the torque may also be independent of the direction of the DC current flowing through electrical coils 308-1 and 308-2. Similarly, during phase B conduction, DC current may be used to excite stator poles of the other phase set (e.g., stator poles 306-1 to 306-4) to subsequently generate a second magnetic flux. A second torque may be generated by a tendency of rotor 310 to align with excited stator poles 306-1 and 306-2. Continuous torque may then be generated by synchronizing consecutive stator poles' excitation with the instantaneous position of rotor poles 312-1 to 312-4 with respect to a particular phase of conduction.

Figure 4:
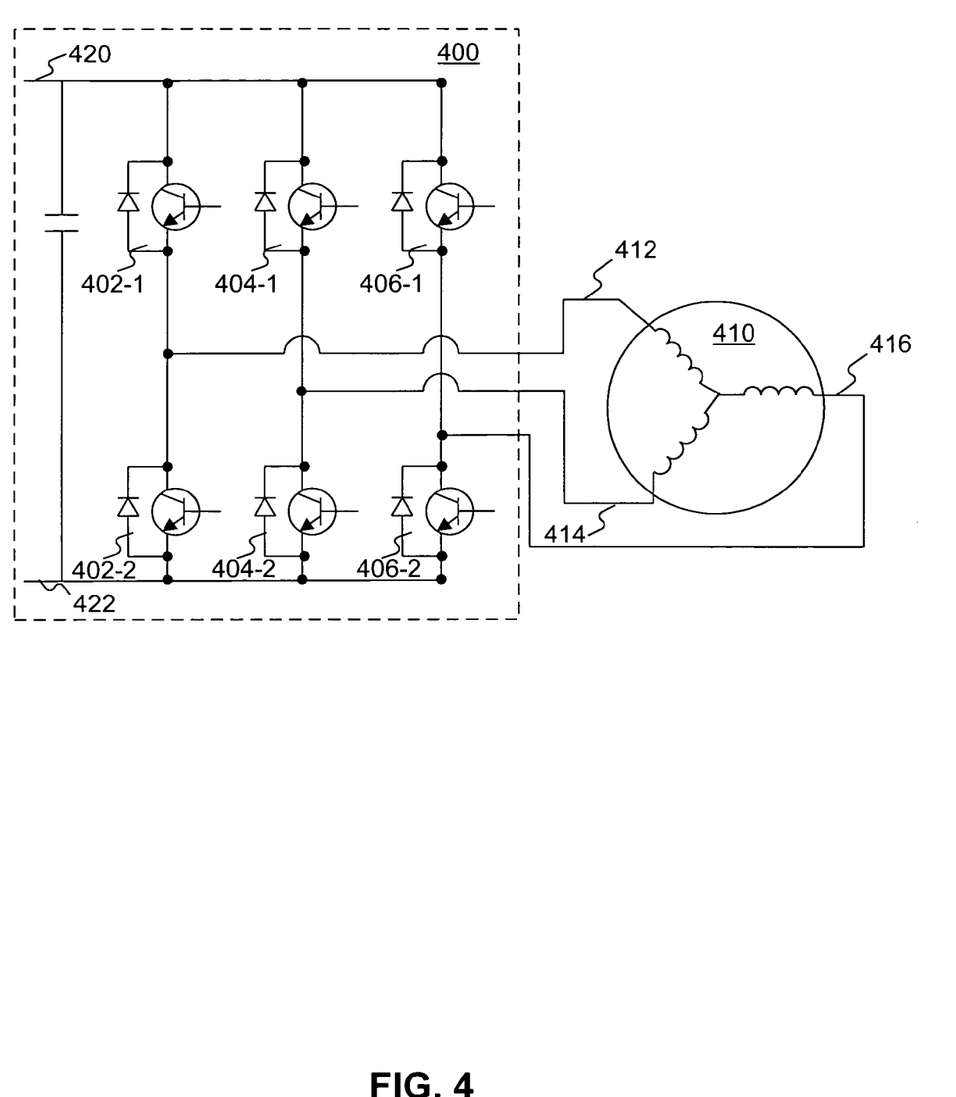
FIG. 4 illustrates atypical power converter for a 3-phase application.

Returning to FIG. 2, power converter 204-1 and 204-2 may be coupled with switched reluctance motors 202-1 and 202-2, respectively, to convert the electric power from power source 112 to DC power at appropriate levels and with appropriate phases to supply phase coils of switched reluctance motors. Power converter 204-1 and 204-2 may be built by using a commercially available power converter for 3-phase applications. FIG. 4 illustrates a typical standard power converter for a 3-phase application.

As shown in FIG. 4, a power converter 400 is provided for a 3-phase induction type motor 410. Power converter 400 may include isolated gate bipolar junction transistor (IGBT) packages 402-1 and 402-2, IGBT packages 404-1 and 404-2, and IGBT packages 406-1 and 406-2. An IGBT package may include a diode and an IGBT. An IGBT can be viewed as a switch. When an appropriate voltage is applied to the base of the IGBT, the switch may be activated and the collector may be electrically connected to the emitter to supply electric power. Electric power may be provided to power converter 400 by an input line 420 and an output line 422. When no voltage is connected to the base of the IGBT, no continuity between the collector and the emitter may exist. The diode may be provided to protect the IGBT from reverse voltage. Further, 3-phase induction type motor 410 may include a phase A coil 412, a phase B coil 414, and a phase C coil 416. IGBT packages 402-1 and 402-2 may be coupled with phase A coil 412 to convert power to supply phase A coil 412. IGBT packages 404-1 and 404-2 may be coupled with phase B coil 414 to convert power to supply phase B coil 414. Further, IGBT packages 406-1 and 406-2 may be coupled with phase C coil to convert power to supply phase C coil 416. The bases of IGBTs in IGBT packages 402-1 and 402-2, 404-1 and 404-2, and 406-1 and 406-2 may be connected to an electronic driver circuit (not shown) called a gate driver board that provides a low voltage to turn on and off IGBTs according to a predetermined control algorithms.

Figure 5:
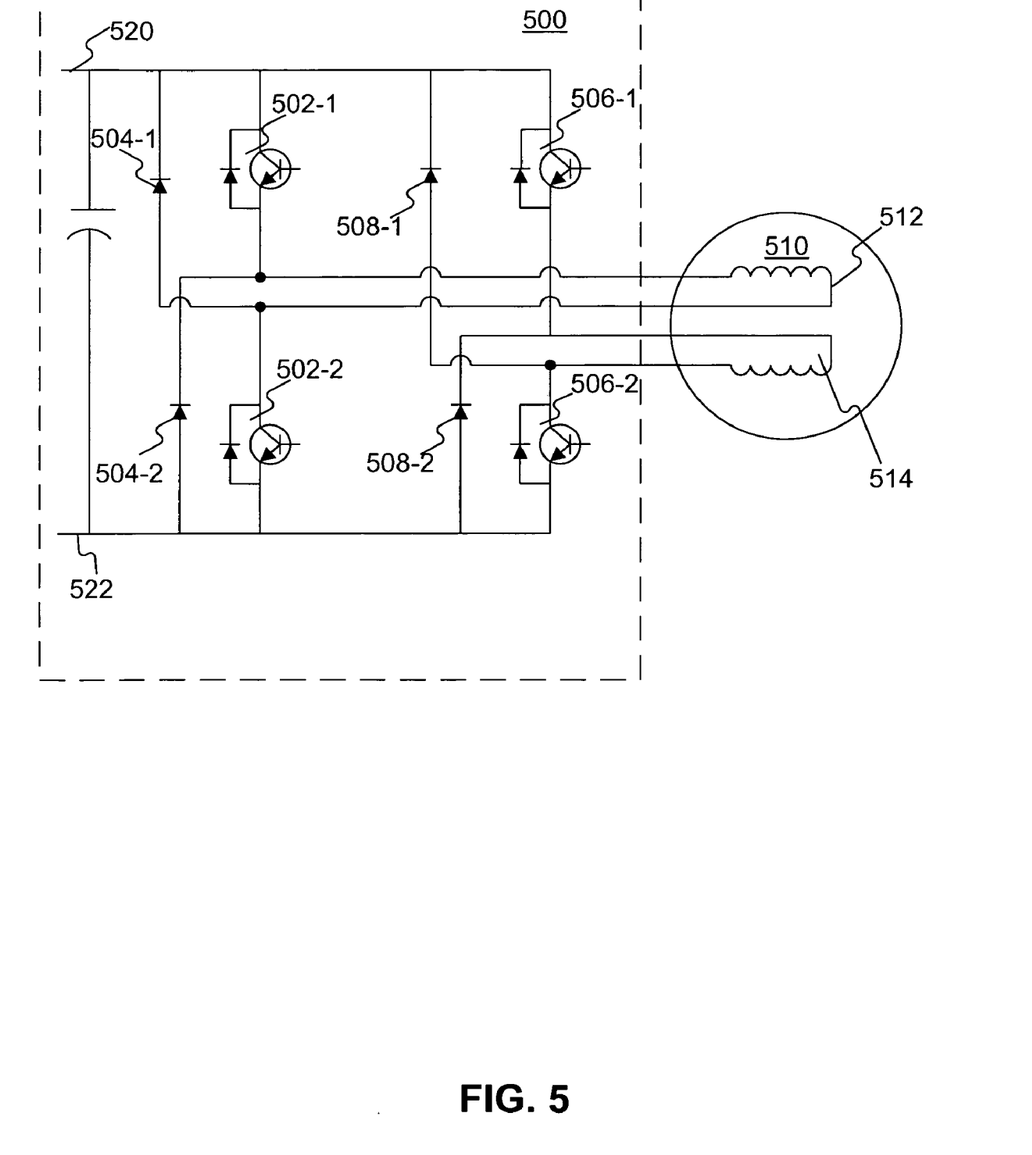
FIG. 5 illustrates a typical power converter for a 2-phase application.

In a 2-phase switched reluctance application, a typical power converter may require both IGBT packages and separate power diodes, which may increase the total number of power semiconductor components used. FIG. 5 shows a typical power converter for a 2-phase switched reluctance application. As shown in FIG. 5, a power converter 500 is provided for a 2-phase switched reluctance motor 510. Power converter 500 may include IGBT packages 502-1 and 502-2, IGBT packages 506-1 and 506-2, power diodes 504-1 and 504-2, and power diodes 508-1 and 508-2. Electric power may be provided to power converter 500 by an input line 520 and an output line 522. Two-phase motor 510 may include a phase A coil 512 and a phase B coil 514. IGBT package 502-1 and power diode 504-1 may be coupled with one lead of phase A coil 512, and IGBT package 502-2 and power diode 504-2 may be coupled with the other lead of phase A coil 512 to convert power to supply phase A coil 512. Similarly, IGBT package 506-1 and power diode 508-1 may be coupled with one lead of phase B coil 514, and IGBT package 506-2 and power diode 508-2 may be coupled with the other lead of phase B coil 514 to convert power to supply phase B coil 514. The total number of power semiconductor components used in a 2-phase application may thus be more than the total number of power semiconductor components used in a 3-phase application.

Figure 6:
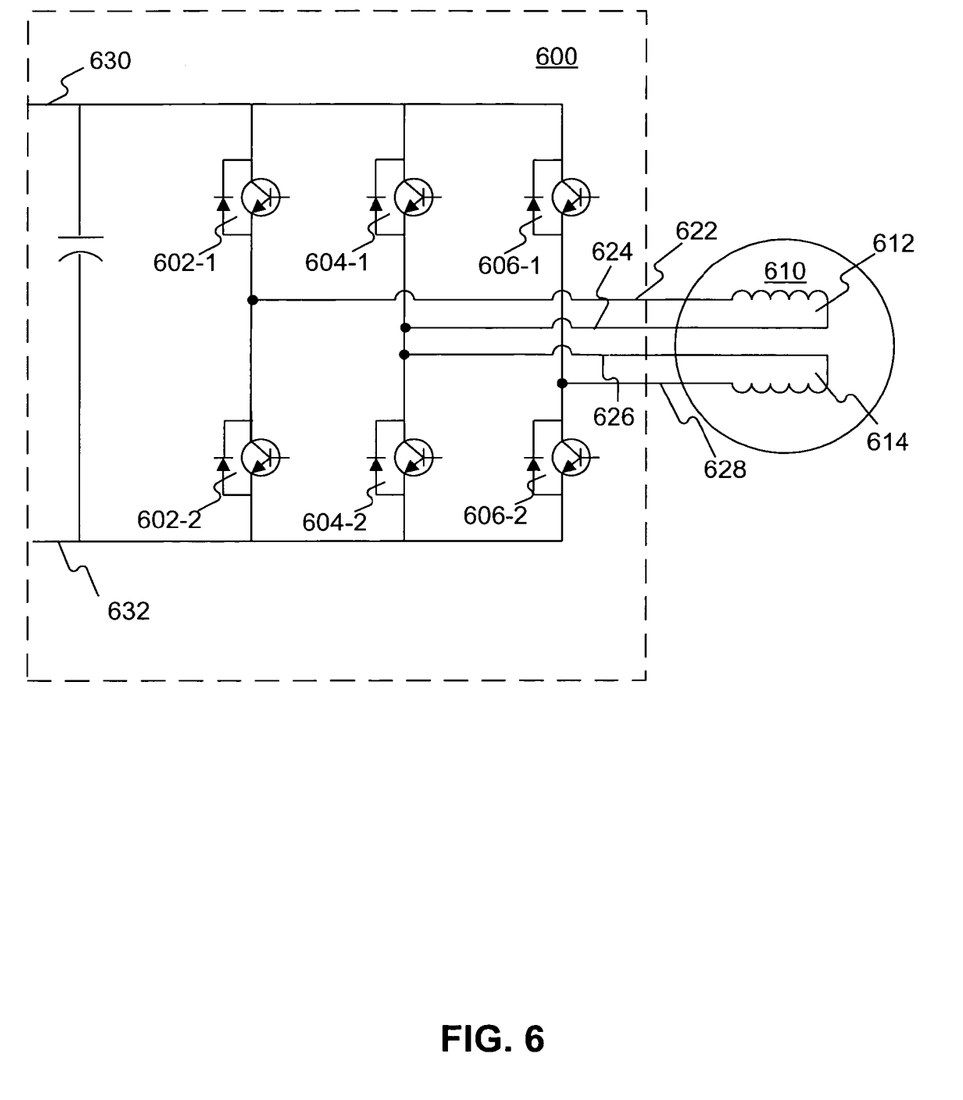
FIG. 6 illustrates an exemplary power converter a 2-phase switched reluctance motor consistent with the disclosed embodiments.

FIG. 6 shows an exemplary power converter 600 for a 2-phase switched reluctance application (e.g., a 2-phase switched reluctance motor or generator) using only IGBT packages. As shown in FIG. 6, power converter 600 may include IGBT packages 602-1 and 602-2, IGBT packages 604-1 and 604-2, and IGBT packages 606-1 and 606-2. Electric power may be provided to power converter 600 by a positive DC power line 630 and a negative DC power line 632. Two-phase switched reluctance motor 610 may include a phase A coil 612 and a phase B coil 614. Phase A coil 612 may have two leads, a positive lead 622 and a negative lead 624. Similarly, phase B coil 614 may also have two leads, a positive lead 626 and a negative lead 628. IGBT packages 602-1 and 602-2 may be coupled with positive lead 622 and IGBT packages 604-1 and 604-2 may be coupled with negative lead 624 to convert power to supply phase A coil 612. On the other hand, IGBT packages 604-1 and 604-2 may be coupled with positive lead 626, and IGBT packages 606-1 and 606-2 may be coupled with negative lead 628 to convert power to supply phase B coil 614.

Operation of 2-phase switched reluctance motor 610 may include phase A conduction and phase B conduction. During phase A conduction, IGBT 602-1 and IGBT 604-2 may be turned on, and current may then flow through phase A coil 612 from positive lead 622 to negative lead 624. IGBT 602-1 and IGBT 604-2 may then be turned off. Phase A conduction, however, may continue by utilizing diodes of IGBT 604-1 and IGBT 602-2. During phase B conduction, IGBT 604-1 and IGBT 606-2 may be turned on, and current may flow through phase B coil 614 from positive lead 626 to negative lead 628. IGBT 604-1 and IGBT 606-2 may then be turned off. Phase B conduction, however, may continue by utilizing diodes of IGBT 606-1 and IGBT 604-2. By repeating phase A conduction and phase B conduction, 2-phase switched reluctance motor 610 may be continuously operated by using IGBT packages typically made for 3-phase applications.

Returning to FIG. 2, switched reluctance traction system 200 may include two separate switched reluctance motors 202-1 and 202-2, each having a power converter as described corresponding to FIG. 6. Further, switched reluctance motors 202-1 and 202-2 may be coupled together by coupling means 206. Coupling means 206 may be any appropriate type of coupling element to couple switched reluctance motors 202-1 and 202-2 such that rotors of switched reluctance motors 202-1 and 202-2 may be shifted some angle relative to each other and stators of switched reluctance motors 202-1 and 202-2 may be aligned with each other. In certain embodiments, switched reluctance motors 202-1 and 202-2 may be coupled mechanically to a single shaft. Alternatively, the coupling element used to connect the motors may include a common gear or gears. The angle between rotors of switched reluctance motors 202-1 and 202-2 may be predetermined based on the number of switched reluctance motors combined (e.g., two), the number of stator poles in each switched reluctance motor, and/or other configurations of switched reluctance traction system 200. For example, 2-phase switched reluctance motors 202-1 and 202-2 may be configured with a shifted angle of approximately 22.5 degrees to form 4-phase switched reluctance traction system 200, where the rotors of switched reluctance motors 202-1 and 202-2 may move approximately 22.5 degrees each time a phase is conducting.

Controller 208 may be any appropriate type of control system used to control and coordinate operations of switched reluctance motors 202-1 and 202-2. Controller 208 may include any appropriate type of switched reluctance motor sensors, microcontrollers or microprocessors, memory modules, or other electronic components. Controller 208 may be configured as one module to control switched reluctance motors 202-1 and 202-2. Alternatively, controller 208 may be configured as separate modules to separately control switched reluctance motors 202-1 and 202-2. Controller 208 may also control gate driver circuitry (not shown) of power converters 204-1 and 204-2. Since control algorithms for gate driver circuitry may correspond to the total number of phases of a motor and/or a generator, those skilled in the art will recognize that any appropriate control algorithm may be used by controller 208.

When coupled, as explained above, the rotors of switched reluctance motors 202-1 and 202-2 may be shifted a particular angle relative to each other. Switched reluctance motors 202-1 and 202-2 may, thus, be able to independently drive switched reluctance traction system 200. Switched reluctance traction system 200 may also be operated bi-directionally without dead bands to generate driving torque. Any torque generated by either switched reluctance motor 202-1 or switched reluctance motor 202-2 may be provided to work machine 100 by torque outputting means 210. The torque outputting means may include a shaft, a gear, and/or an axle. It is contemplated that other torque outputting arrangements can be utilized.

Figure 7A:
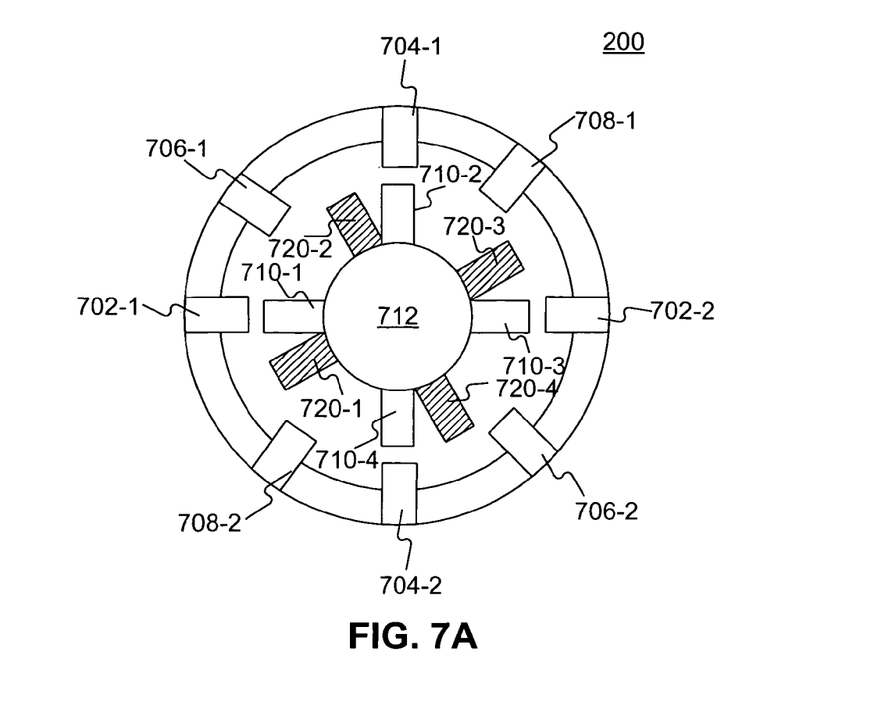
FIGS. 7A–7D illustrate a control sequence of the exemplary switched reluctance traction system.

FIGS. 7A–7D shows an exemplary control sequence of switched reluctance traction system 200. FIG. 7A shows phase A conduction of switched reluctance motor 202-1. As shown in FIG. 7A, switched reluctance motor 202-1 may include stator poles 702-1 and 702-2, stator poles 704-1 and 704-2, stator poles 706-1 and 706-2, and stator poles 708-1 and 708-2. Because the stator poles of switched reluctance motor 202-1 may be aligned with stator poles of switched reluctance motor 202-2, stator poles of switched reluctance motors 202-2 are not shown. Switched reluctance motor 202-1 may also include rotor 712 and rotor poles 710-1 to 710-4. Rotor poles 720-1 to 720-4 may be included in switched reluctance motor 202-2 and may be shifted with an angle relative to rotor poles 710-1 to 710-4, respectively. In one embodiment, the shifted angle may be approximately 22.5 degrees.

In operation, controller 208 may determine the position of rotor poles 710-1 and 710-2 as shown in FIG. 7A. Controller 208 may cause stator poles 702-1 and 702-2 of switched reluctance motor 202-1 to be excited. As previously explained, when stator poles 702-1 and 702-2 are excited, a torque may be generated by rotor poles 710-1 and 710-2 to rotate rotor 712. Because switched reluctance motors 202-1 and 202-2 are coupled together, rotor poles 720-1 to 720-4 may also be rotated along with rotor poles 710-1 to 710-4. After rotor poles 710-1 to 710-4 rotate a certain angle, for example, 22.5 degrees, phase A conduction of switched reluctance motor 202-1 may be completed. Controller 208 may then decide to start phase A conduction of switched reluctance motor 202-2.

Figure 7B:
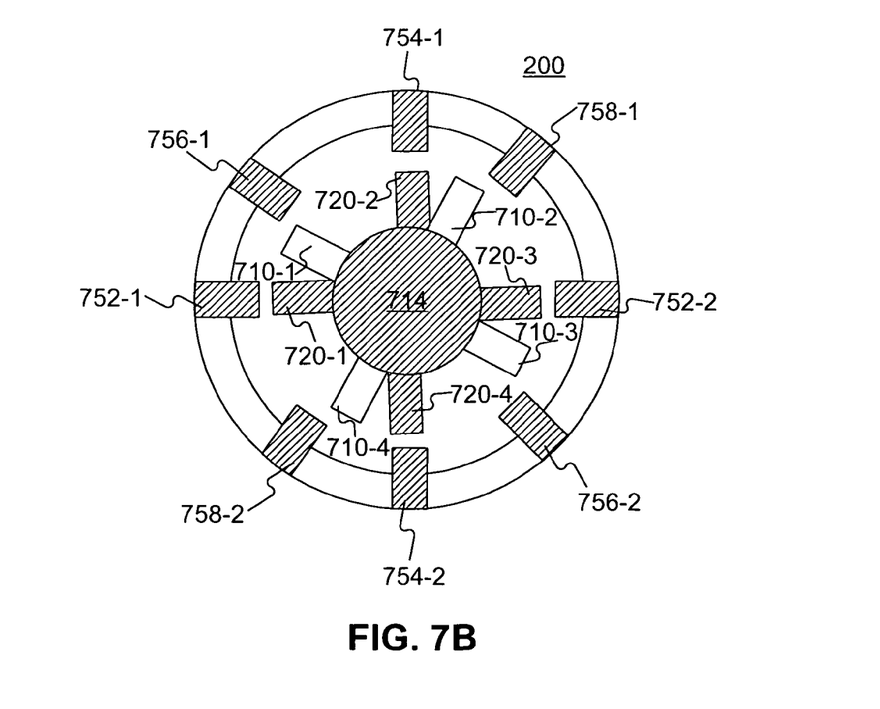

FIG. 7B shows phase A conduction of switched reluctance motor 202-2. As shown in FIG. 7B, switched reluctance motor 202-2 may include stator poles 752-1 and 752-2, 754-1 and 754-2, 756-1 and 756-2, and 758-1 and 758-2. Similarly, stator poles of switched reluctance motor 202-1 are not shown because the stator poles of switched reluctance motors 202-1 may be aligned with stator poles of switched reluctance motor 202-2. Switched reluctance motor 202-2 may also include rotor 714 and rotor poles 720-1 to 720-4. Switched reluctance motor 202-1 may include rotor poles 710-1 to 710-4.

After phase A conduction of switched reluctance motor 202-1 is completed, stator poles 752-1 and 752-2 may be excited. When stator poles 752-1 and 752-2 are excited, a torque may be generated by rotor poles 720-1 and 720-2 to rotate rotor 714. After rotor poles 710-1 to 710-4 rotate a certain angle, for example, 22.5 degrees, phase A conduction of switched reluctance motor 202-2 may also be completed. Controller 208 may then decide to start phase B conduction of switched reluctance motor 202-1.

Figure 7C:
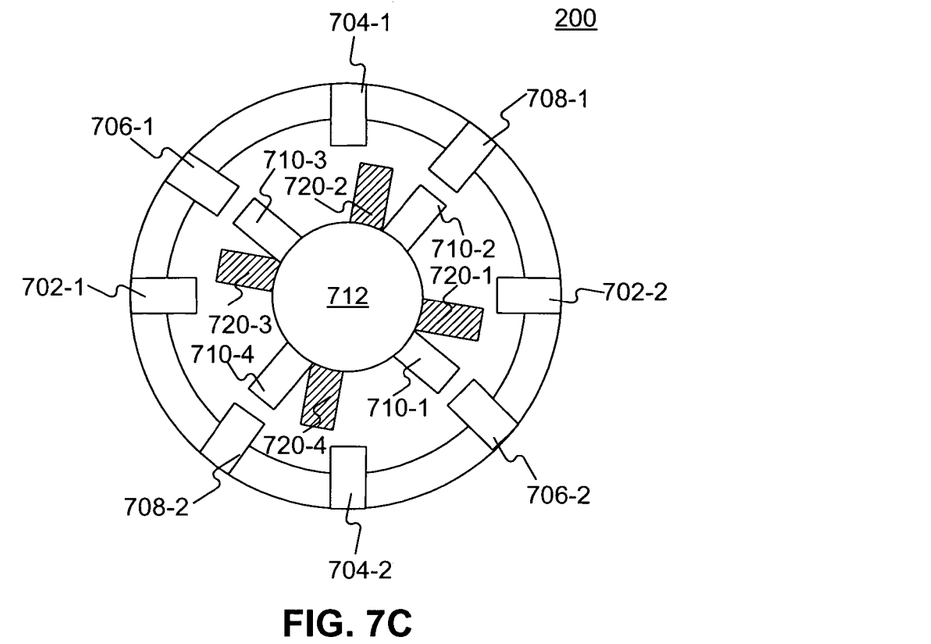

FIG. 7C shows phase B conduction of switched reluctance motor 202-1. As shown in FIG. 7C, switched reluctance motor 202-1 may include stator poles 702-1 and 702-2, stator poles 704-1 and 704-2, stator poles 706-1 and 706-2, and stator poles 708-1 and 708-2. Because the stator poles of switched reluctance motor 202-1 may be aligned with stator poles of switched reluctance motor 202-2, stator poles of switched reluctance motors 202-2 are not shown. Switched reluctance motor 202-i may also include rotor 712 and rotor poles 710-1 to 710-4. Rotor poles 720-1 to 720-4 may be included in switched reluctance motor 202-2 and may be shifted with an angle (e.g., about 22.5 degrees) relative to rotor poles 710-1 to 710-4, respectively.

During phase B conduction of switched reluctance motor 202-1, stator poles 708-1 and 708-2 may be excited. When stator poles 708-1 and 708-2 are excited, a torque may be generated by rotor poles 710-2 and 710-4 to rotate rotor 712 for another 22.5 degrees. After rotor poles 710-1 to 710-4 rotate 22.5 degrees, phase B conduction of switched reluctance motor 202-1 may also be completed. Controller 208 may then decide to start phase B conduction of switched reluctance motor 202-2.

Figure 7D:
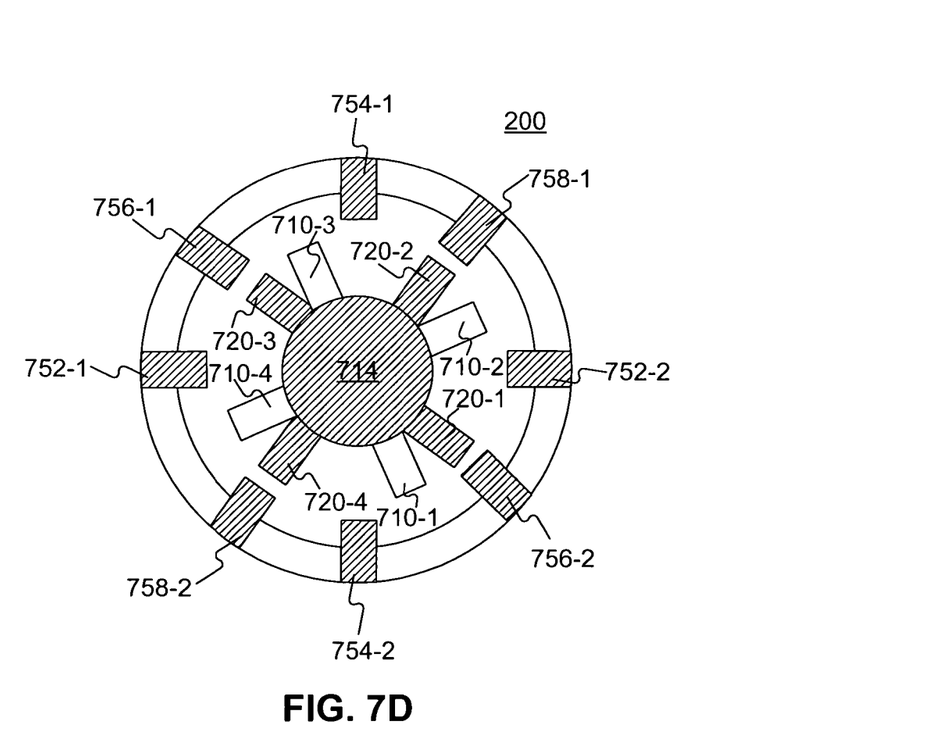

FIG. 7D shows phase B conduction of switched reluctance motor 202-2. As shown in FIG. 7D, switched reluctance motor 202-2 may include stator poles 752-1 and 752-2, 754-1 and 754-2, 756-1 and 756-2, and 758-1 and 758-2. Similarly, stator poles of switched reluctance motor 202-1 are not shown because the stator poles of switched reluctance motors 202-1 may be aligned with stator poles of switched reluctance motor 202-2. Switched reluctance motor 202-2 may also include rotor 714 and rotor poles 720-1 to 720-4. Switched reluctance motor 202-1 may include rotor poles 710-1 to 710-4.

During phase B conduction of switched reluctance motor 202-2, stator poles 758-1 and 758-2 may be excited. When stator poles 758-1 and 758-2 are excited, a torque may be generated by rotor poles 720-2 and 720-4 to rotate rotor 714 for another 22.5 degrees. After rotor poles 720-1 to 720-4 rotate 22.5 degrees, phase B conduction of switched reluctance motor 202-1 may be completed. At the end of phase B conduction of switched reluctance motor 202-2, rotor poles 710-1 to 710-4 and rotor poles 720-1 to 720-4 may be back in the original positions as in FIG. 7A. Controller 208 may decide to start phase A conduction of switched reluctance motor 202-1 again. By repeating the control sequence illustrated in FIGS. 7A–7D, switched reluctance motors 202-1 and 202-2 together may support four phases of conduction thus forming an effective 4-phase switched reluctance traction motor 200.

Although only two 2-phase switched reluctance motors are shown in FIGS. 7A–7D, more than two 2-phase switched reluctance motors may be used to form a 2n-phase switched reluctance traction motor/generator system, where n is the total number of the 2-phase switched reluctance motors.

INDUSTRIAL APPLICABILITY

The disclosed switched reluctance traction system may include two 2-phase switched reluctance motors combined together to provide an effective 4-phase switched reluctance traction system. Further, multiple 2-phase switched reluctance motors may be combined to form a 2n-phase switched reluctance traction system, where n is the total number of the combined 2-phase switched reluctance motors. The resulting 2n-phase switched reluctance traction system (n is greater than 1) may be capable of bi-directional operation without dead bands. Thus, the disclosed switched reluctance traction system may be a desired solution for a traction motor powertrain. The multi-motor switched reluctance traction system may also include certain advantages of switched reluctance technology and provide a highly differentiated, lower cost electric powertrain solution.

Further, the disclosed switched reluctance traction system may also include power converters using standard power electronic components used for 3-phase applications. The use of standard available power converter technology may reduce the cost of the switched reluctance traction system.

Other embodiments, features, aspects, and principles of the disclosed exemplary systems will be apparent to those skilled in the art and may be implemented in various environments not limited to work site environments.

What is claimed is:

1. A switched reluctance traction system, comprising:
   a plurality of switched reluctance motors, each having a stator with a plurality of stator poles and a rotor with a plurality of rotor poles;
   one or more coupling elements to couple together the plurality of switched reluctance motors such that each of the plurality of motors is capable of driving the switched reluctance traction system independently; and
   a plurality of 2-phase power converters to supply electric power to the plurality of switched reluctance motors, wherein each 2-phase power converter uses isolated gate bipolar junction transistor (IGBT) packages without additional discrete power semiconductor devices.

2. The switched reluctance traction system according to claim 1, wherein the stator poles of one switched reluctance motor are aligned with the stator poles of another switched reluctance motor and the rotor poles of one switched reluctance motor are shifted by a predetermined angle relative to the rotor poles of another switched reluctance motor.

3. The switched reluctance traction system according to claim 2, further including:
   a controller configured to control phase conduction sequences of the plurality of switched reluctance motors.

4. The switched reluctance traction system according to claim 3, wherein each of the plurality of switched reluctance motors independently drives the switched reluctance traction system during a corresponding phased conduction sequence.

5. The switched reluctance traction system according to claim 2, wherein the predetermined angle is determined based on a total number of motors among the plurality of switched reluctance motors and a total number of stator poles in each of the plurality of switched reluctance motors.

6. The switched reluctance traction system according to claim 2, wherein the plurality of switched reluctance motors are 2-phase switched reluctance motors, and
   the plurality of switched reluctance motors are configured to provide 2n phases for the switched reluctance traction system, where n is the total number of motors among the plurality of switched reluctance motors.

7. The switched reluctance traction system according to claim 6, wherein the total number n is 2, and the predetermined angle is about 22.5 degrees.

8. A method for driving a machine, comprising:
   generating electrical power with a power source;
   supplying a portion of the power to a multi-motor switched reluctance traction system;
   generating a torque with the multi-motor switched reluctance traction system; and
   applying the torque to traction devices of the machine,
   wherein the multi-motor switched reluctance traction system further includes:
   a plurality of 2-phase switched reluctance motors, each having a stator with a plurality of stator poles and a rotor with a plurality poles, and
   one or more coupling elements to couple together the plurality of 2-phase switched reluctance motors such that each of the plurality of motors is capable of driving the switched reluctance traction system independently; and
   a plurality of 2-phase power converters to supply electric power to the plurality of switched reluctance motors, wherein each 2-phase power converter uses isolated gate bipolar junction transistor (IGBT) packages without additional discrete power semiconductor devices.

9. The method according to claim 8, wherein the plurality of 2-phase switched reluctance motors are coupled by:
   determining a shifting angle between rotors of the plurality of 2-phase switched reluctance motors based on total number of motors among the plurality of 2-phase switched reluctance motors and total number of stator poles in each of the plurality of 2-phase switched reluctance motors; and coupling together the plurality of 2-phase switched reluctance motors such that the stator poles of one motor are aligned with the stator of another motor and the rotor poles of one motor are shifted by the shifting angle relative to the rotor poles of another motor.

10. The method according to claim 9, wherein the total number n is 2, and the shifting angle is about 22.5 degrees.

11. The method according to claim 8, wherein the 2-phase switched reluctance motors include a first phase and a second phase and generating torque further includes:
   conducting the first phase of the first 2-phase switched reluctance motor;
   conducting the first phase of the second 2-phase switched reluctance motor;
   conducting the second phase of the first 2-phase switched reluctance motor; and
   conducting the second phase of the second 2-phase switched reluctance motor.

12. A 2-phase switched reluctance motor, comprising:
   a phase A coil having a positive lead and a negative lead;
   a phase B coil having a positive lead and a negative lead; and
   a power converter to supply power to the phase A coil and the phase B coil, the power converter including:
      a positive DC power line and a negative DC power line coupled with a DC power source;
      a first isolated gate bipolar junction transistor (IGBT) package coupled between the positive DC power line and positive lead of the phase A coil,
      a second IGBT package coupled between the positive lead of the phase A coil and the negative DC power line;
      a third IGBT package coupled between the positive DC power line and both the negative lead of the phase A coil and the positive lead of the phase B coil;
      a fourth IGBT package coupled between both the negative lead of the phase A coil and the positive lead of the phase B coil and the negative DC power line;
      a fifth IGBT package coupled between the positive DC power line and the negative lead of the phase B coil; and
      a sixth IGBT package coupled between the negative lead of the phase B coil and the negative DC power line.

13. The 2-phase switched reluctance motor according to claim 12, further including:
   a controller to control operation of the IGBT packages.

14. A machine, comprising:.
   a switched reluctance traction system including:
      a plurality of switched reluctance motors, each having a stator with a plurality of stator poles and a rotor with a plurality of rotor poles;
      a coupling device to couple together the plurality of switched reluctance motors such that the stator poles of one motor are aligned with the stator poles of another motor and the rotor poles of one motor are shifted by a predetermined angle relative to the rotor poles of another motor;
      a plurality of 2-phase power converters to supply electric power to the plurality of switched reluctance motors, wherein each 2-phase power converter uses isolated gate bipolar junction transistor (IGBT) packages without additional discrete power semiconductor devices, and
   a power source configured to provide electrical power to the switched reluctance traction system.

15. The machine according to claim 14, further including:
   a chassis configured to support the switched reluctance traction system; and
   a controller to control one or more functions of the switched reluctance traction system and the power source.

16. The machine according to claim 14, wherein the plurality of switched reluctance motors are 2-phase switched reluctance motors, and
   the plurality of 2-phase switched reluctance motors are configured to provide 2n phases for the switched reluctance traction system, where n is the total number of motors among the plurality of switched reluctance motors.

17. The machine according to claim 16, wherein the predetermined angle is determined based on a total number of motors among the plurality of switched reluctance motors and a total number of stator poles in each of the plurality of switched reluctance motors, and n is 2.

* * * * *

UNITED STATES PATENT AND TRADEMARK OFFICE
CERTIFICATE OF CORRECTION

PATENT NO. : 7,202,625 B2 Page 1 of 1
APPLICATION NO. : 11/066248
DATED : April 10, 2007
INVENTOR(S) : Adra et al.

It is certified that error appears in the above-identified patent and that said Letters Patent is hereby corrected as shown below:

1. In Column 8, Line 57, delete "202-i" and insert --202-1--

In the claims:

2. In Column 10, Line 52, in Claim 8, after "plurality" insert --of rotor--

3. In Column 11, Line 7, in Claim 9 after "stator" insert --poles--

Signed and Sealed this

Thirteenth Day of May, 2008

JON W. DUDAS
*Director of the United States Patent and Trademark Office*